Aug. 7, 1928.
C. G. BARRON
1,679,704
GLARE SHIELD
Filed March 12, 1926 2 Sheets-Sheet 1
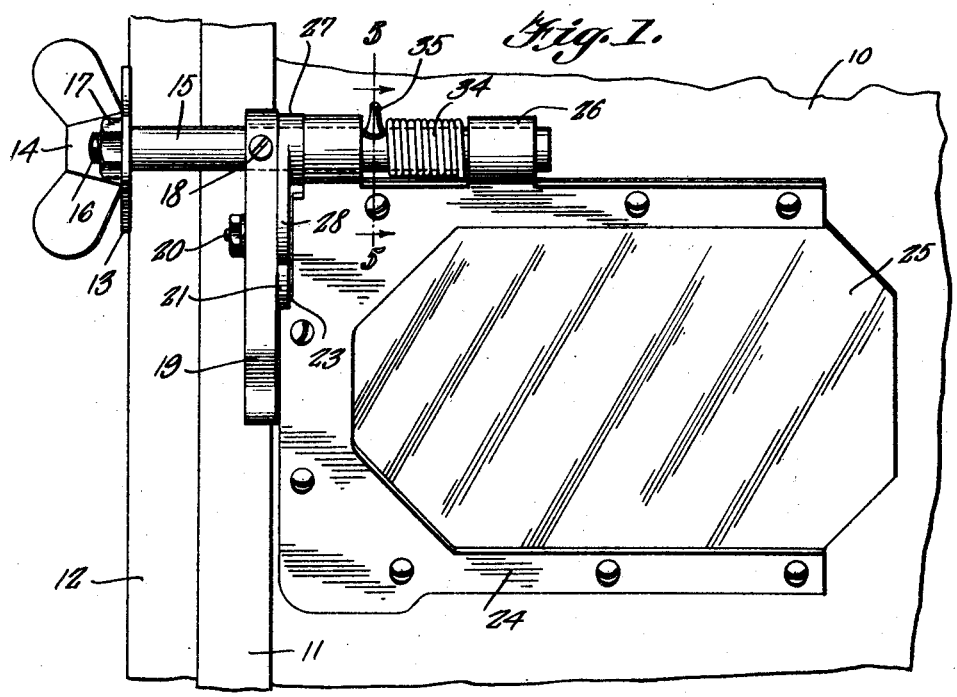
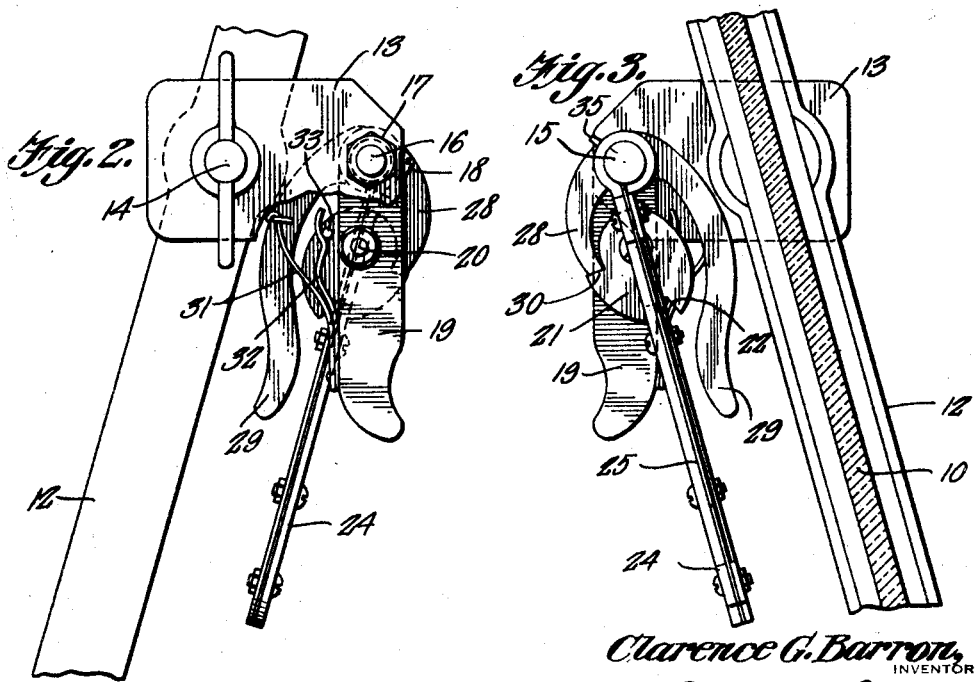
Clarence G. Barron, INVENTOR
BY Victor J. Evans ATTORNEY
WITNESS:

Aug. 7, 1928.
C. G. BARRON
1,679,704
GLARE SHIELD
Filed March 12, 1926
2 Sheets-Sheet 2
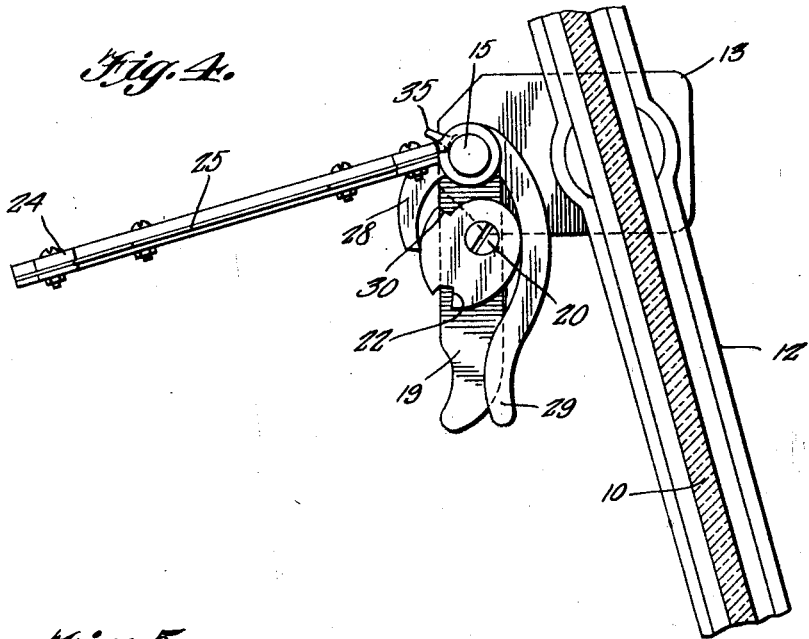
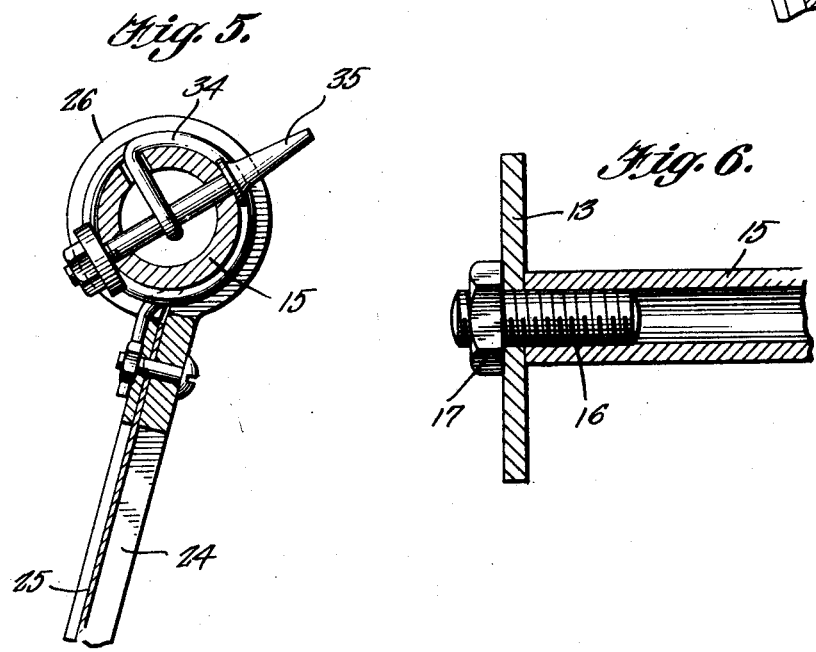
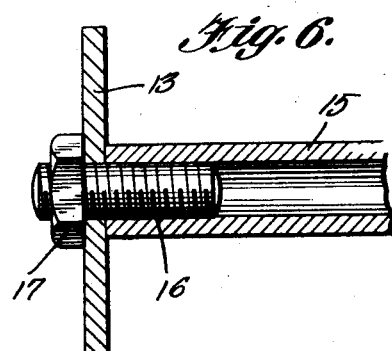
Clarence G. Barron, INVENTOR
BY Victor J. Evans
ATTORNEY
WITNESS:

Patented Aug. 7, 1928.

1,679,704

UNITED STATES PATENT OFFICE.

CLARENCE G. BARRON, OF LOS ANGELES, CALIFORNIA.

GLARE SHIELD.

Application filed March 12, 1926. Serial No. 94,259.

This invention relates to non-glare devices for use upon automobiles and other vehicles, the primary object of the invention being to provide a device which may be easily and quickly moved into position for use and securely held in such position and automatically moved out of position upon the release of the holding means.

Another object of the invention is the provision of a non-glare device which may be adjusted into and out of position for use almost instantaneously and thus require a minimum amount of attention from the driver and permit of its adjustment upon short notice.

With the above and other objects in view, the invention further includes the following novel features and details of construction, to be hereinafter more fully described, illustrated in the accompanying drawings and pointed out in the appended claims.

In the drawings:—

Figure 1 is an elevation illustrating the device in position, a portion of the windshield of an automobile being shown for this purpose.

Figure 2 is an edge view of the same.

Figure 3 is a view looking at the opposite edge from that shown in Figure 2, with the windshield in section.

Figure 4 is a view similar to Figure 3 with the non-glare panel in raised position.

Figure 5 is a section on the line 5—5 of Figure 1.

Figure 6 is a longitudinal sectional view illustrating the connection between the bearing member and bracket.

Referring to the drawings in detail wherein like characters of reference denote corresponding parts, the reference character 10 indicates a portion of the glass panel of an automobile windshield, a portion of the frame of which is shown at 11, while 12 indicates a portion of one of the side standards of the windshield, the construction being of the usual type found in open automobiles. While the device is shown as applied to an automobile windshield of this character, it is of course understood that it may be applied to a closed car with slight variations in the attaching means.

In the form of the invention illustrated there is provided a plate or bracket 13 having an opening therein for the passage of a stud or plate 14, by means of which the plate or bracket may be clamped to the standard 12. This bolt may form a part of the usual windshield structure, or it may consist of a plate especially provided for the purpose.

The bracket 13 carries a bearing member herein shown as a tube 15, this member being secured to the plate 13 by a bolt or threaded stud 16 and a nut 17. The opposite end of the member 15 may be closed in any suitable manner.

Rigidly secured to the bearing member 15, as by a set screw 18, is an arm 19 and mounted for pivotal movement on this arm as at 20 is a disk 21. This disk is provided with a notch 22 which is designed to receive an offset portion 23 provided in one edge of a frame 24. This frame carries a non-glare panel 25 of suitable material and is provided with spaced apertured lugs 26 which receive the bearing member 15. The construction is such that when the panel 25 is moved to an active position as shown in Figures 1, 2 and 3 of the drawings, the offset portion 23 of the frame 24 will be positioned within the notch 22, but when the panel is in the position shown in Figure 4, the frame and disk 21 will be separated.

Pivotally mounted upon the bearing member 15 is a latch 27 which includes a dog 28 and a handle 29. This dog is adapted to engage a shoulder 30 which extends inwardly from the periphery of the disk 21 and when so engaged will hold the disk in the position shown in Figures 1, 2 and 3 of the drawings. The latch 27 is yieldingly held in position by means of a spring 31 which is carried by the arm 19, while the disk 21 is yieldingly held in the position shown in Figure 4 by a spring 32. This spring as shown in Figure 2 of the drawings is provided with an intermediate inwardly offset portion while the disk 21 is provided with a pin 33 which is adapted to engage upon opposite sides of this offset portion.

A spring 34 which surrounds the bearing member 15 acts to yieldingly force the panel 25 upward and this movement is limited by a stop 35 which extends from the bearing member 15.

Normally, the panel is in the position illustrated in Figure 4 of the drawings. When it is desired to move the panel into position for use, it is pulled downward until the offset portion 24 enters the notch 22, the spring 32 acting to hold the disk 21 in proper position for this purpose. Continued downward movement will rotate the disk 21 upon its pivot 20 until the spring 31 forces the dog 28 to engage the shoulder 30 of the disk 21. The panel will then be held in lowered or active position. By pressing upon the handle 29 so as to move the latter in the direction of the panel, the disk 21 will be released so as to release the frame and permit the panel to move upward under the action of the spring 34.

The invention is susceptible of various changes in its form, proportions and minor details of construction and the right is herein reserved to make such changes as properly fall within the scope of the appended claims.

Having described the invention what is claimed is:—

1. A non-glare shield for vehicles comprising a rigidly mounted bearing member, a frame pivotally mounted thereon and adapted to be moved to an active or inactive position, a non-glare panel within the frame, an arm rigid with the bearing member, a movable member carried by the arm to detachably engage the frame when the panel is in an active position, a latch to hold the frame engaging member in position and means to move the panel to an inactive position when said member is released.

2. A non-glare shield for vehicles comprising a rigidly mounted bearing member, a frame pivotally mounted thereon and adapted to be moved to an active or inactive position, a non-glare panel within the frame, an arm rigid with the bearing member, a pivotally mounted spring actuated disk engageable with the frame when the panel is in an active position, a spring actuated pivotally mounted latch engageable with the disk to hold the latter against movement and means to move the panel to an inactive position when the disk is released.

3. A non-glare shield for vehicles comprising a rigidly mounted bearing member, a frame pivotally mounted thereon and adapted to be moved to an active or inactive position, a non-glare panel within the frame, an arm rigid with the bearing member, a pivotally mounted spring actuated disk having a notch therein to receive the frame when the panel is in an active position, a spring actuated member mounted for pivotal movement upon the bearing member, said member including a dog for engagement with the disk to hold the panel in an active position and means to move the panel to an inactive position and a handle rigid with the dog when the member is operated to release the disk.

In testimony whereof I affix my signature.

CLARENCE G. BARRON.